United States Patent [19]

Wurz et al.

[11] Patent Number: 5,389,127
[45] Date of Patent: Feb. 14, 1995

[54] METHOD OF CLEANING A DROP SEPARATOR AND DROP SEPARATOR WITH CLEANING DEVICE

[76] Inventors: Dieter Wurz, Gartenweg 7, D-7570 Baden-Baden; Stefan Hartig, Oberkirchstrasse 27, D-7590 Achern; Hubert Wolf, Dompfaffweg 1, D-4005 Meerbusch, all of Germany

[21] Appl. No.: 50,355
[22] PCT Filed: Dec. 7, 1991
[86] PCT No.: PCT/EP91/02348
  § 371 Date: May 3, 1993
  § 102(e) Date: May 3, 1993
[87] PCT Pub. No.: WO92/11075
  PCT Pub. Date: Jul. 9, 1992

[30] Foreign Application Priority Data

Dec. 21, 1990 [DE] Germany ............... 4041165

[51] Int. Cl.⁶ ............................. B01D 45/18
[52] U.S. Cl. ................................ 95/281; 55/230; 55/242; 55/280; 55/440
[58] Field of Search .............. 95/75, 212, 278, 281; 55/230, 242, 257.2, 257.3, 280, 440, 444

[56] References Cited

U.S. PATENT DOCUMENTS

| | | | |
|---|---|---|---|
| Re. 18,328 | 1/1932 | Fedeler | 95/281 X |
| 1,312,721 | 8/1919 | Carrier | 55/257.2 X |
| 2,077,996 | 4/1937 | Hall | 55/230 |
| 2,143,979 | 1/1939 | Feinberg | 55/440 X |
| 2,878,892 | 3/1959 | Field | 55/230 X |
| 3,159,471 | 12/1964 | Revell | 55/230 X |
| 3,918,941 | 11/1975 | Fallon, III | 55/230 |
| 4,099,938 | 7/1978 | Onnen | 55/242 X |
| 4,157,251 | 6/1979 | Colomer | 55/230 X |
| 4,240,809 | 12/1980 | Elsbernd et al. | 55/230 X |
| 4,251,242 | 2/1981 | Ito | 55/242 |
| 4,731,100 | 3/1988 | Loeffelmann et al. | 95/281 |
| 4,784,674 | 11/1988 | Sarmiento et al. | 55/440 X |
| 5,221,297 | 6/1993 | Childress et al. | 95/75 |

FOREIGN PATENT DOCUMENTS

| | | |
|---|---|---|
| 2224193 | 10/1974 | France . |
| 2297070 | 8/1976 | France ........... 95/278 |
| 2318217 | 10/1974 | Germany . |
| 3316527 | 11/1984 | Germany . |
| 3434133 | 1/1986 | Germany . |

OTHER PUBLICATIONS

"Hochwirksame Tropfenabscheider bei der Rauchgasreinigung", Chemische Industrie, vol. 1/83, by Seigfried Bulang (3 pages).
Excerpt from "Perry's Chemical Engineering's Handbook" Sixth Edition, pp. 18-74.

*Primary Examiner*—Robert Spitzer
*Attorney, Agent, or Firm*—Herbert Dubno

[57] ABSTRACT

A method for cleaning a drop separator includes the steps of mounting a plurality of parallel blades along a gas channel, spraying the blades with cleaning jets of wash water pulsed from a plurality of flat jet nozzles, and displacing the plurality of the nozzles perpendicular to a direction of gas flow while spraying the blades.

14 Claims, 6 Drawing Sheets

METHOD OF CLEANING A DROP SEPARATOR AND DROP SEPARATOR WITH CLEANING DEVICE

CROSS REFERENCE TO RELATED APPLICATIONS

This application is a national phase application corresponding to PCTEP91/02348 filed Dec. 7, 1991 and based in turn, upon an application filed in Germany as P 40 41 165.6 filed Dec. 21, 1990 under the International Convention.

FIELD OF THE INVENTION

This invention relates to a method for cleaning a drop separator and to a cleaning device carrying out the method.

Downstream of any gas scrubber generally a drop separator is provided in a first scrubber of a two-stage gas scrubbing installation, e.g. for the cleaning of flue gas, with a first scrubber for the removal of dust and optionally of HCl and a second scrubber for $SO_2$ removal.

A drop separator has plates, called separator plates or blades extending over the entire cross section of a gas channel, e.g. a flue gas channel and which are arranged parallelly to each other and curved in the flow direction of the flue gas. The arrangement of the blades is known for instance from "Perry's Chemical Engineering Handbook, Sixth Edition, FIGS. 18–110 (b)", or from the publication "Hochwirksame Tropfenabscheider bei der Rauchgasreinigung (Sonderdruck aus Heft 1/83 Chemische Industrie)". The drops contained in the gas or separated at the blades run down on the blades acting as baffle surfaces. The problem with such drop separators are the deposits forming on the blades, which tend to clog the drop separator.

In order to clean the drop separator it is known from the above-mentioned publication to provide the drop separator with a cleaning device equipped with stationary nozzles installed in the gas channel. The nozzles arranged before and optionally also after the blades in the flow direction of the gas are fully conical nozzles, whose cone covers the entire cross section of the gas channel (compare with FIG. 4). The cleaning during which the blades are sprayed and rinsed with cleaning water jets corresponding to the conical shape of the nozzle takes place at intervals.

Particularly in the case of flue gases with a high proportion of fly ash, such as, for instance, downstream from an older electrofilter, the cleaning performed by this nozzle arrangement is not satisfactory. The drop separator clogs easily which results in frequent standstills, while the deposits are removed, for instance, by water under high pressure or by compressed air. In the worst cases the drop separator has to be replaced.

An essential drawback of the cleaning methods using stationary conical nozzles consists in the fact that the separator plates are not evenly hit by the cleaning jets. Blind spots are formed from which the clogging of the drop separator starts.

OBJECTS OF THE INVENTION

It is the object of the invention to develop a method for cleaning a drop separator which obtains an improved cleaning efficiency. The other object of the invention is to provide a drop separator capable of carrying out the method according to the invention.

SUMMARY OF THE INVENTION

According to the method of the invention the mutually parallel blades, curved in the direction of the gas flow are cleaned by moving flat cleaning jets over the blades transversely to the longitudinal extent of the blades.

The blades are swept by the cleaning jets with the same force and at the same angle. In opposition thereto the force of a conical, stationary jet decreases from the center of the jet outwardly. As a result the various blades hit by one jet are swept with variable force and at variable angles, which leads to the already mentioned blind spots. Therefore an important advantage of the method is the fact that the blind spots, i.e. areas which are hit by the cleaning jets only slightly or not at all, can be avoided to the largest extent.

Besides, fewer nozzles are required. Also the water amount required per nozzle is lower when compared to the water amount required by the cleaning with stationary, conical cleaning jets.

A further advantage of the method is the use of cleaning jets ejected by flat nozzles, whose force—and therefore their cleaning effect—is essentially bigger than the one of conical cleaning jets. Besides when using flat cleaning jets it is possible to set the angle of the oncoming flow with respect to the blade arrangement so that the areas of the blades mostly exposed to contamination can be reached as extensively as possible.

The moving of cleaning jets leads to a uniform, mechanically enhanced cleaning of the blades and as a result to a longer life of the drop separator.

The advantage of the method is a stronger cleaning process.

According to the method the blades are set to vibrate, which leads to a further increase in the efficiency of the cleaning process.

Another advantage of the method is the cleaning process which is enhanced by the use of an abrasive substance, such as sand, in the water.

The cleaning process is also enhanced according to the invention by dissolving the deposits with the aid of an additive, e.g. sulfuric acid, in the wash water.

The apparatus according to the invention includes the nozzle pipes mounted on a frame which is movable in the gas channel essentially perpendicular to the longitudinal extent of the blades and perpendicular to the direction of gas flow, thus displacing the cleaning jets over the blades during an interval with the aid of a simple linear drive.

Flexible hoses compensate for the motion-conditioned variations in the distance of the nozzle pipes to the wash water supply.

The flat jet nozzles which are arranged so that perpendicularly to the blades a flat jet is formed while parallelly to the blades a fan-like jet is formed, generate a highly mechanical cleaning effect.

According to the invention the frame of the cleaning device is connected by swinging bars to a fastening device, e.g. carrier, in the gas channel or with a channel cover. The advantage of the mobility of the frame due to a swinging arrangement is that the frame remains mobile when it has been contaminated by dirt. This feature is particularly suitable for drop separator with horizontal flow.

According to a further feature of the invention the frame of the cleaning device is connected with a chassis. To make the displaceability of the frame possible by means of a chassis is a simple solution and can be particularly suitable for a drop separator with vertical flow.

Still according to a further feature the simple connection between the frame and the linear drive is utilized.

The simple connection of the hoses with the wash water supply is also suggested.

Advantageously several nozzle pipes are supplied by a single hose. This feature is particularly suited for gas channels with small cross section.

The mouth pieces according to the invention prevent the fan-like dispersion of the cleaning jets by the gas flow. This leads to an enhanced cleaning. It is particularly effective to arrange the mouth pieces behind the blades in the direction of the gas flow and therefore suitable for a drop separator with nozzles arranged behind the blades, because the jets have to hit the blade surface against the direction of the gas flow.

A further positive effect of the mouth pieces consists in the fact that the areas of the drop separator impacted by the cleaning jets are covered by the mouth pieces, so that in these areas the drop separator is not traversed by the gas stream partially entraining the drops.

The cleaning process can be further improved by an adjustable impact angle of the flat jet nozzles, according to one of the features of the invention.

Finally the apparatus is designed to prevent the washing fluid from escaping of the end of a cleaning interval.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
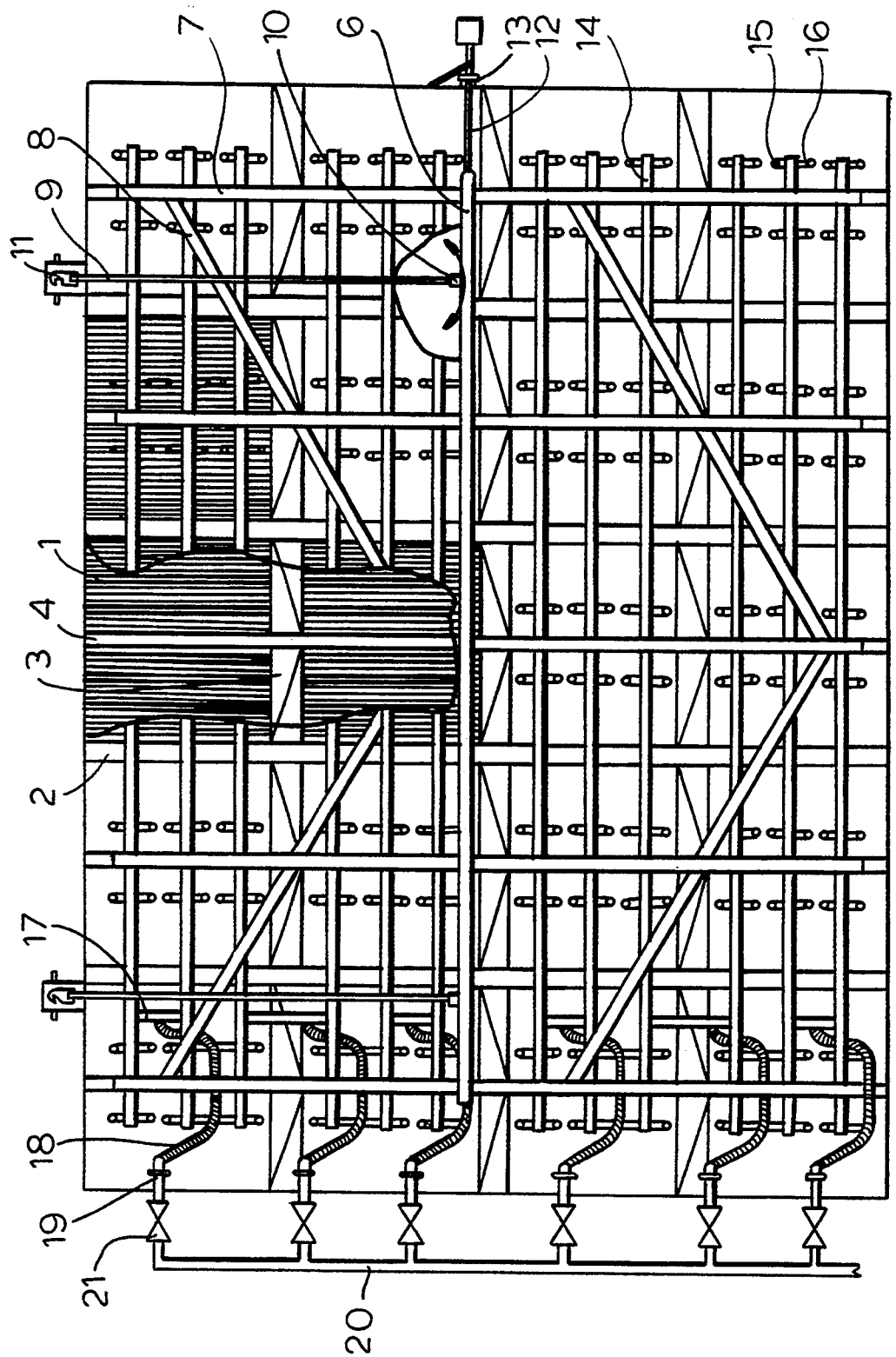
FIG. 1 is a side view of the cleaning device of the drop separator with horizontal flow.

A drop separator with horizontal flow, as shown in FIG. 1 is arranged in the flue gas channel between a first and a second scrubber of a gas scrubbing installation, has a four-tier separating device covering the cross section of the gas channel, whereby in each tier five blade packets 1 are arranged next to each other. The blade packets 1 are supported on carriers 2 arranged between the blade packets 1 and running perpendicularly downward, through all tiers. Underneath the blade packets 1, there are water collecting tanks 3 and in their middle profiles 4, whereby the water collecting tanks 3 abut the profiles 4 of the blade packets 1 arranged therebelow.

The drop separator has a total of twenty blade packets 1. The surfaces covered by the carriers 2, the water collecting tanks 3 and the profiles 4, as well as the borders of the separating installation are shielded in front and behind the separating installation, in the direction of the gas flow.

In the blade packets 1, blades 5 having a contour curved in the direction of the flue gas flow (arrow A in FIG. 3) with a so-called drain nose on the apex of their curvature, are arranged parallelly to each other. The blades 5 of the two halves of a blade packet 1 divided by the profile 4 are mirror images of each other and readily seen in FIG. 3.

A cleaning device of the drop separator has a frame on each front and rear sides of the separating installation, in the direction of the flue gas.

Each of the frames has a middle section 6 with respective five carrier sections 7 fastened thereto and running in upward and downward directions. In order to reinforce the stability of the frame, the carrier sections 7 are connected to each other and to the middle section 6 by bracing sections 8. In this case the bracing sections 8 form an upper and lower "V".

The frame is mounted by means of two swinging bars 9 to a cover of the flue gas channel. The swinging bars 9 are connected via links 10 with the middle section 6 and via further links 11 with the cover of the flue gas channel. This way the frame is movably mounted in the flue gas channel.

The middle section 6 is connected with a drive rod 12. The drive rod 12 leads via the packing box 13 through the wall of the flue gas channel and is connected to a linear drive, e.g. a spindle drive. The drive can be of the electric, hydraulic or pneumatic kind.

Figure 2:
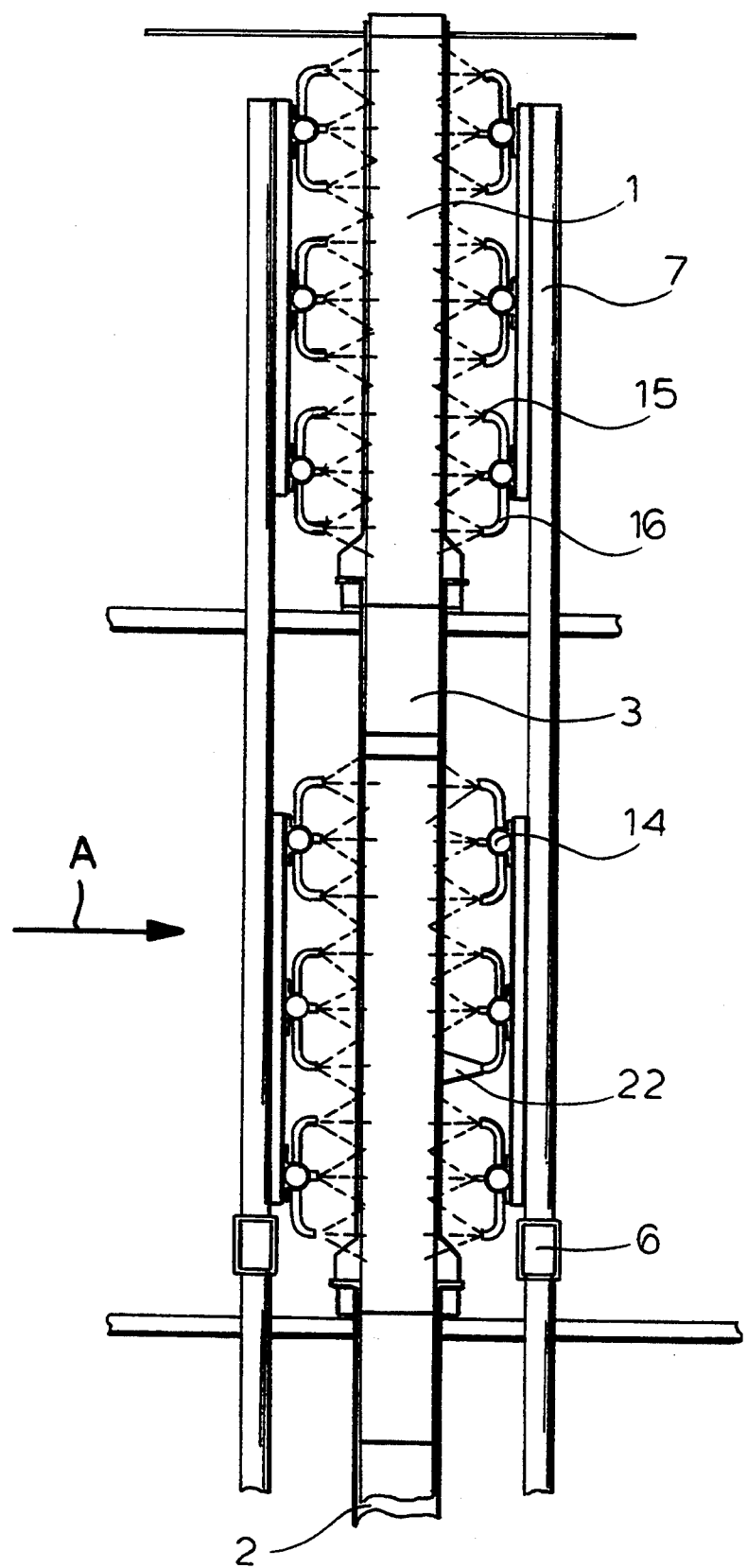
FIG. 2 is a partial vertical section of the drop separator with cleaning device.

On the carrier sections 7, in each tier three mutually parallel nozzle pipes 14 are arranged, which run perpendicularly with respect to the blades 5. Symmetrically on both sides of a carrier section 7, on a nozzle pipe 14 there is a nozzle arrangement with three flat jet nozzles 15, mounted on extension arms 16 extending upward and downward from the nozzle pipe 14 and on the nozzle pipe 14 (FIG. 2). This way on a nozzle pipe 14 there are thirty flat jet nozzles 15.

The cleaning device is arranged in front of the separating installation so that the carrier sections 7 run vertically over the middle of the blade packet 1. The distance between the nozzle arrangements on both sides of a carrier section 7 of a nozzle pipe 14 is slightly less than half the width of a blade packet 1. The distance between the flat jet nozzles 15 of a nozzle pipe arrangement, the distance between the lower flat jet nozzles 15 of an upper pipe nozzle 14 and the distance of the upper flat jet nozzles 15 of a nozzle pipe 14 lying underneath it in the same tier is the same.

Figure 3:
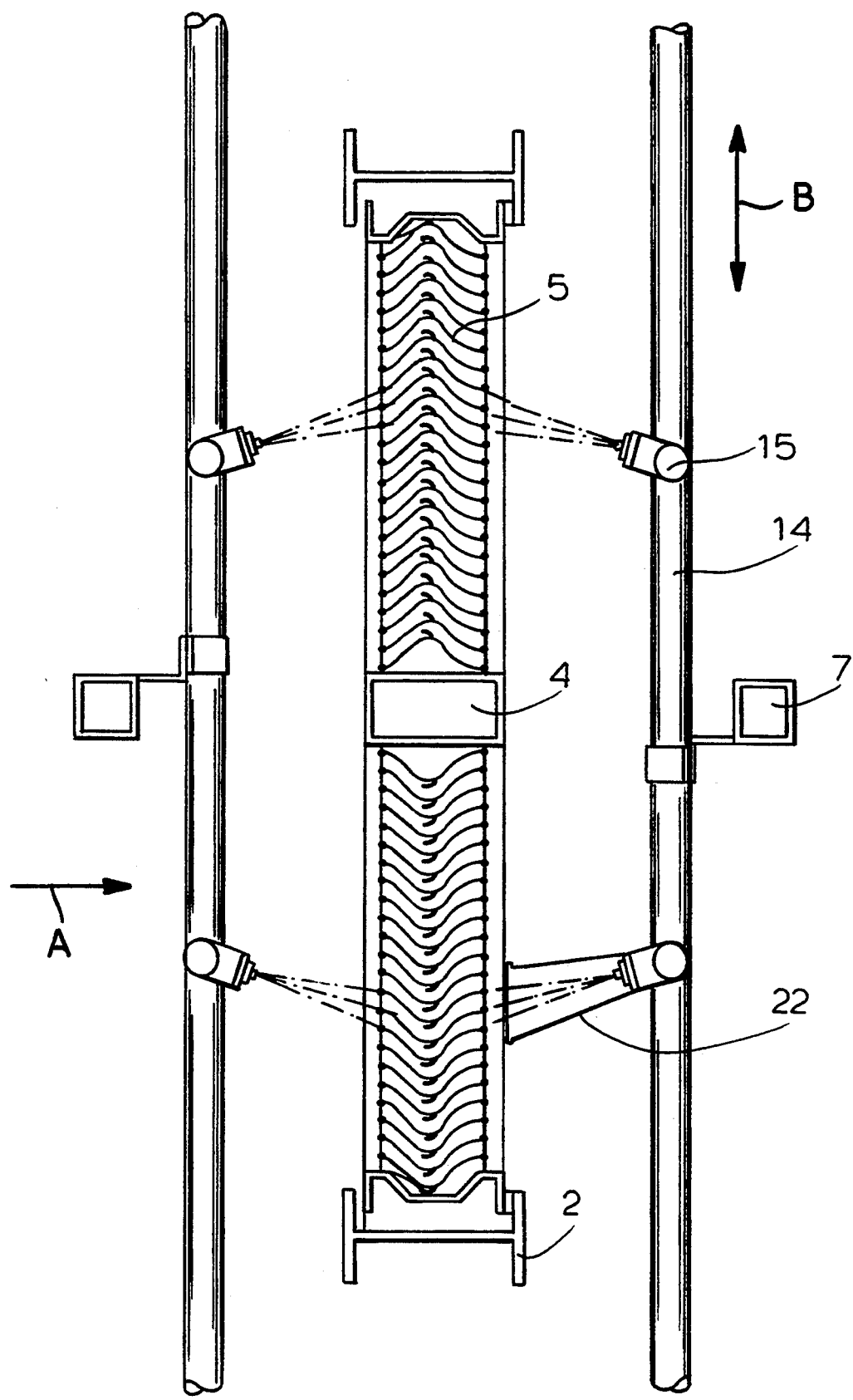
FIG. 3 is a part of a horizontal section.

The flat jet nozzles 15 are designed so that the impact angle of the cleaning jets can be adjusted between 0° and 15°. An angle of 10° is set. Thereby the directions of the jets of the flat jet nozzles 15 of the two halves of a blade packet 1 are spread apart in a symmetrical mirror image of each other, so that the cleaning jets are aimed between the curved blades 5 (FIG. 3).

In this example, each time two nozzle pipes 14 are connected to each other via connection pipes 17. To this total of six connection pipes 17 the hoses 18 are connected. These hoses are connected to a connection socket 19 provided in the wall of the flue gas channel. Outside, in front of the wall there is a supply pipe 20 for the wash water, which branches into the connection socket 19 over solenoid valves 21.

In a variant of the drop separator, mouth pieces 22 are provided, which are shaped like flat funnels and start from the flat jet nozzles 15 extending towards the blades 5. Preferably these mouth pieces 22 are mounted only in the flow direction of the flue gas downstream of the separating installation. A mouth piece 22 for a flat jet nozzle 15 has been drawn in FIG. 3 as an example.

Figure 4:
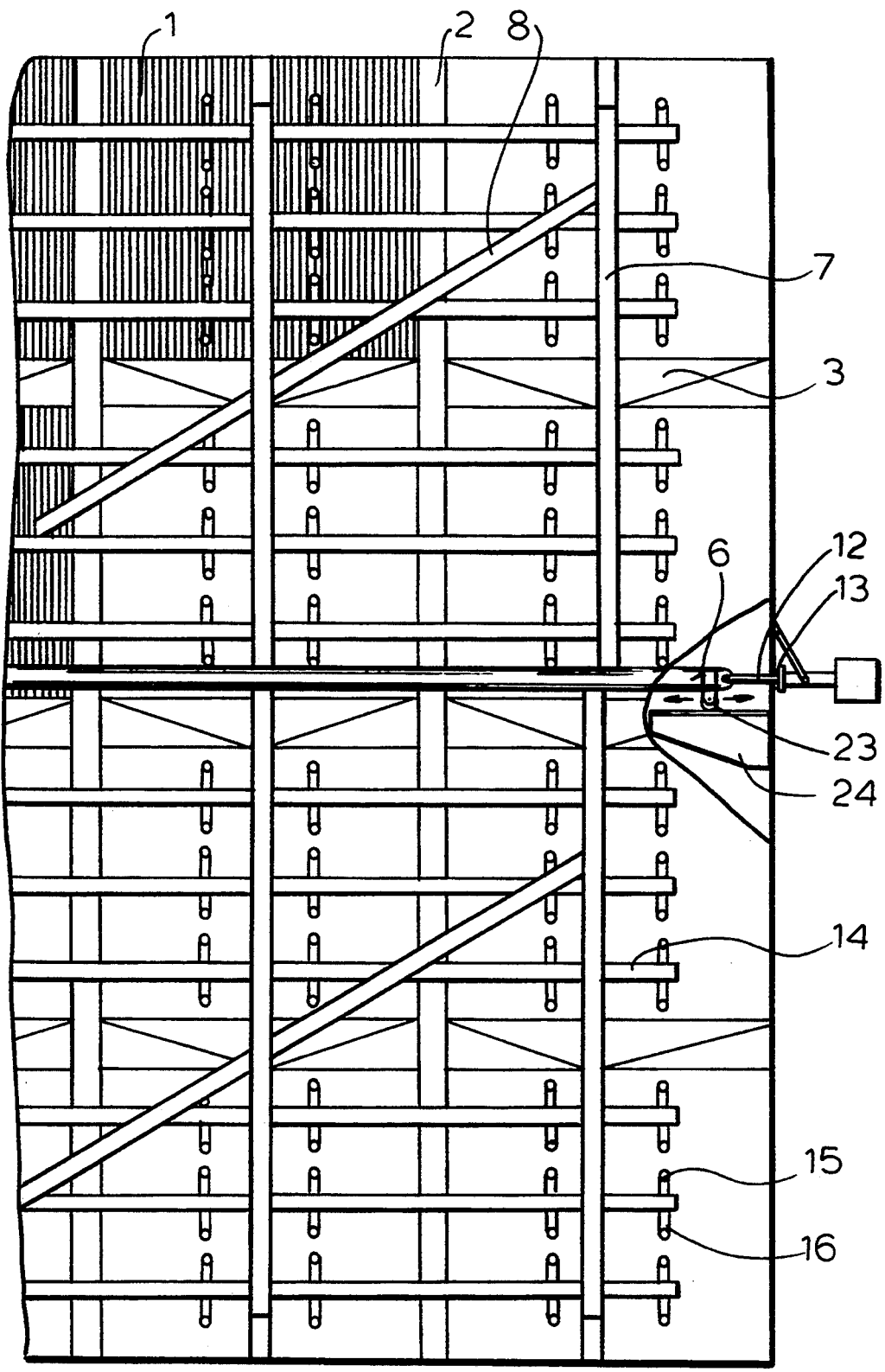
FIG. 4 is another embodiment of the cleaning device.

In a further variant, each of the two frames are connected with a chassis, having two wheels 23 and two mountings 24. The mountings 24 are fastened to the walls of the flue gas channel and are provided with running surfaces for the wheels. The wheels 23 are each fastened under the middle sections 6 on their ends (FIG. 4).

In a further variant, all flat jet nozzles 15 are arranged on upwardly directed extension arms 16.

In operation the cleaning of the drop separator takes place in two intervals per hour. During the interval, the six solenoid valves 21 located on each side of the separating installation are successively opened, so that in a first rinsing process the flat jet nozzles 15 of the upper two nozzle pipes 14 activated by the first solenoid valves 21 are in operation, in the second interval the flat jet nozzles 15 of the third nozzle pipe 14 of the upper tier and of the first nozzle pipe 14 of the second tier, triggered by the second solenoid valves 21 are operating, and so on. Each solenoid valve 21 is opened for 2 min., i.e. the duration of one rinsing process is 2 min. and the duration of an interval is 12 min.

At a precompression of 4 bar, the output of a flat jet nozzle 15 amounts to 30 l/min. For the thirty flat jet nozzles 15 per nozzle pipe 14 the output per solenoid valve 21 is 900 l/min. and the total water amount for both sides in an interval is 7200 l.

During the rinsing process the linear drive moves each middle section 6 with a speed of 5 to 15 mm/s, e.g. 9 mm/s, in vertical direction perpendicular to the flow direction of the flue gas, whereby the cleaning jets nozzles move over the blades 5 in the direction indicated by arrow B and therefore perpendicular to the blades 5, covering respectively one half of a blade packet 1. In addition, the cleaning jets are pulsed in the natural frequency of blades 5.

Solid substances with abrasive action, such as sand and/or substances, e.g. sulfuric acid, which chemically dissolve the deposits, can be admixed.

The number of the required nozzles is reduced by five to ten times and the water amount required per interval is reduced by two to three times compared with a cleaning process using stationary, fully conical cleaning jets.

Figure 5:
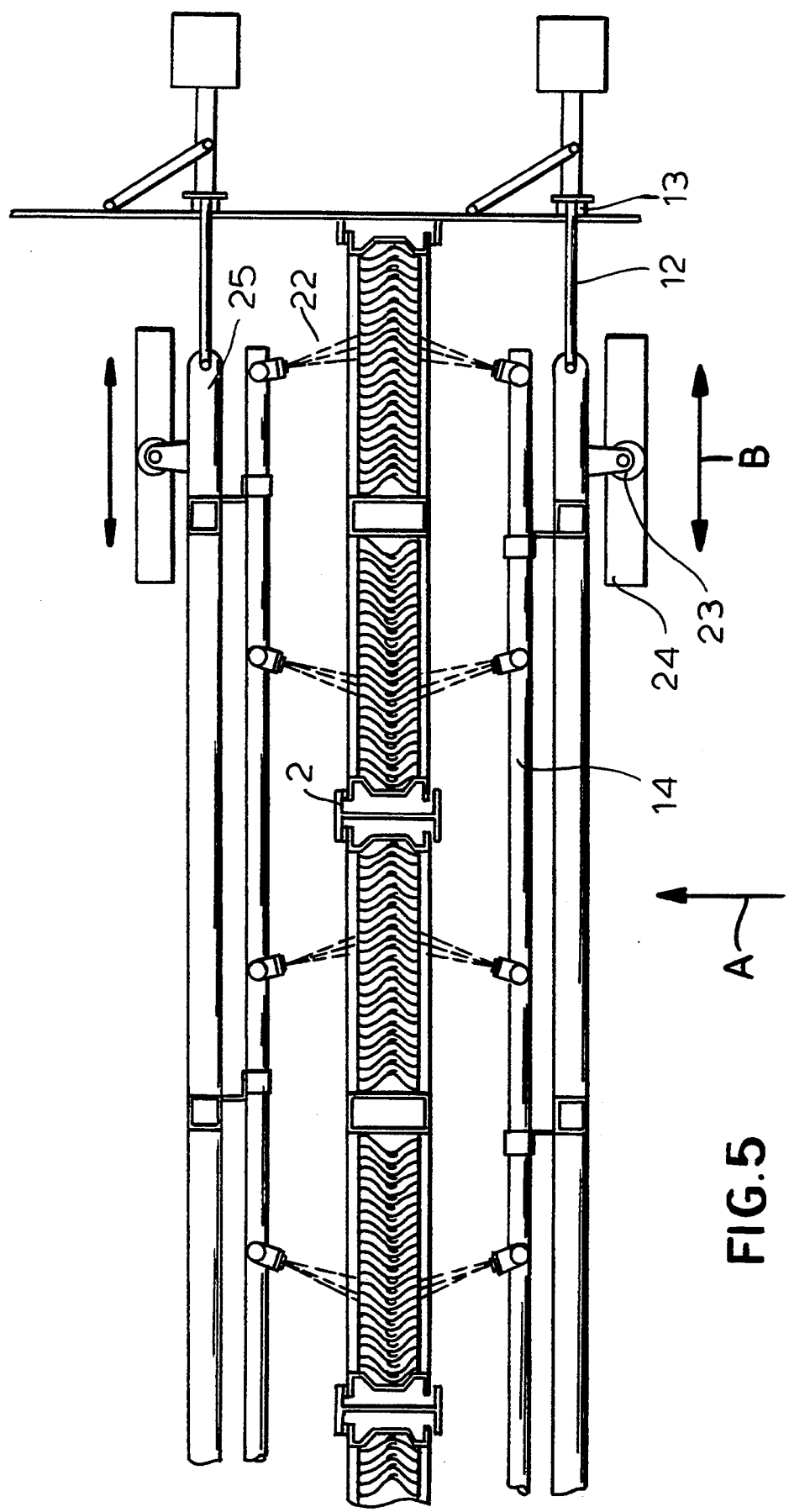
FIG. 5 is a drop separator with vertical flow and provided with the cleaning device according to the invention.

A drop separator with vertical flow as shown in FIG. 5 is arranged optionally downstream of a counter-flow scrubber of flue gas scrubbing installation.

The separating installation according to this embodiment has no water collecting tanks 3.

Figure 6:
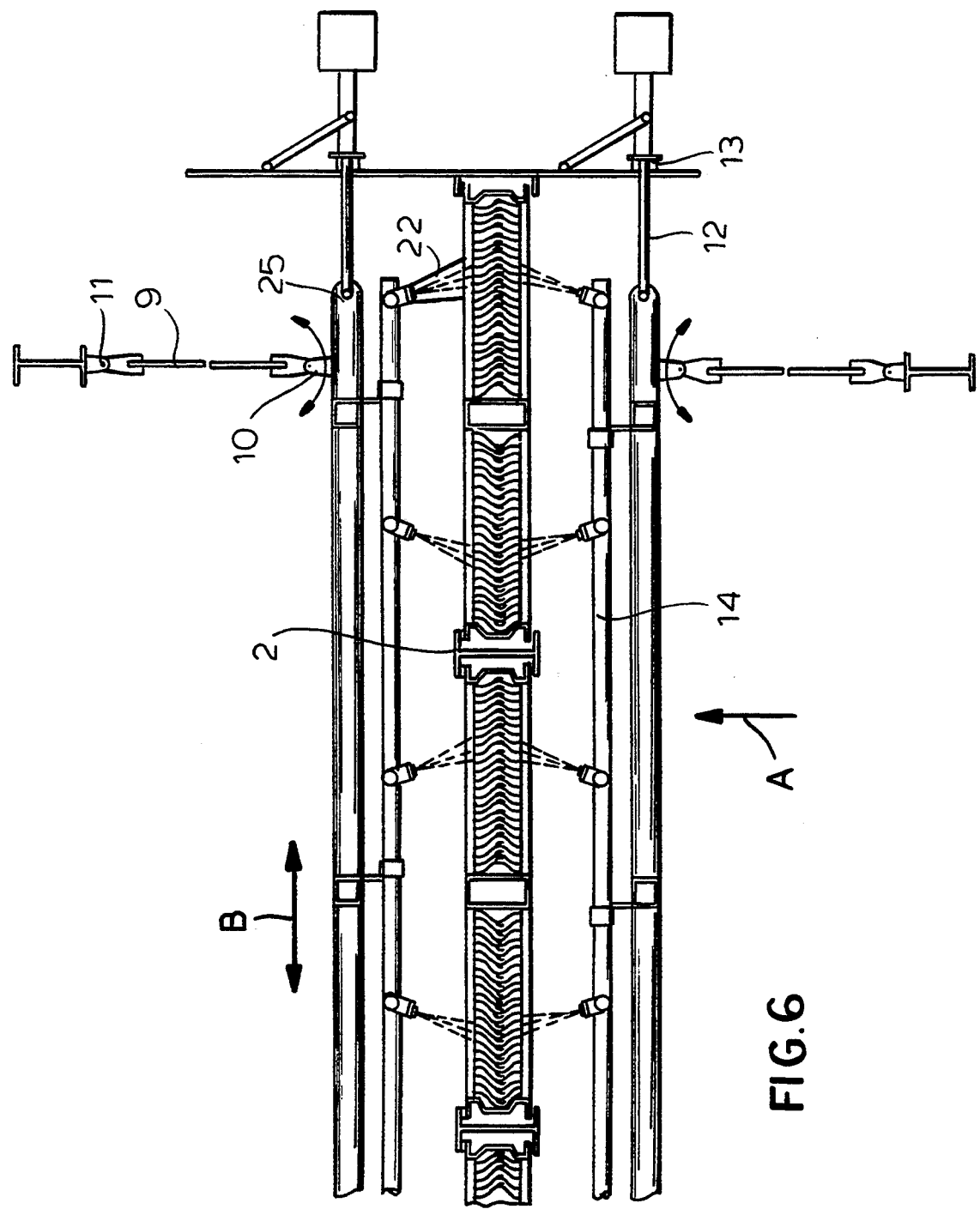
FIG. 6 is another embodiment of the drop separator with vertical flow according to the present invention.

In addition to the middle sections 6, the frames have two drive sections 25 (which can not be seen from FIGS. 5 and 6) on each of the two sides of the middle sections 6 and parallel thereto. Each drive section 25 is connected with a driving rod 12. The driving rods 12 traverse a wall of the flue gas channel through a packing box 13 and are connected with a linear drive as shown in FIG 1.

The frames are connected with chassis provided with wheels 23 and mountings 24. The wheels for the lower frame are fastened under the drive sections 25 and the wheels for the upper frame are fastened above the drive sections 25. The wheels 23 are on running surfaces, respectively in the case of the upper frame under the running surfaces, of the mountings 24.

In a variant of the drop separator, the frames of the cleaning device, namely the drive profiles 25, are connected over links 10 with the swinging bars 9. The swinging bars 9 are connected over further links 11 with carriers in the flue gas channel, or optionally in the case of the upper frame, with the cover of the flue gas channel.

We claim:

1. A method for cleaning a drop separator, comprising the steps of:
   (a) mounting a plurality of mutually parallel and spaced apart blades curved in a direction of gas flow over a cross section of a gas channel and extending longitudinally and generally perpendicular to the direction of gas flow, thereby forming deposits on the blades;
   (b) pulsing cleaning jets of wash water from a plurality of flat jet nozzles across the gas channel over the plurality of blades, thereby spraying the blades with flat cleaning jets removing deposits from the blades; and
   (c) simultaneously with step (b) displacing the plurality of flat jet nozzles perpendicular to the direction of the gas flow and perpendicular to the longitudinal extent of said blades.

2. The method defined in claim 1 wherein the wash water is pulsed at a frequency corresponding to the natural frequency of the blades.

3. The method defined in claim 1, further comprising the step of admixing a substance in the wash water capable of removing said deposits.

4. The method defined in claim 3, further comprising the step of chemically dissolving the deposits of impurities by the substances.

5. The method defined in claim 3, further comprising the step of abrading the deposits with the substance.

6. The method defined in claim 1 wherein the jets of wash water are directed in said direction of gas flow.

7. The method defined in claim 1 wherein the jets of wash water are directed against the direction of gas flow.

8. A drop separator comprising:
   a housing formed with a gas channel in a gas flow which contains material to be removed therefrom;
   a plurality of spaced apart and mutually parallel blades mounted in the gas channel, each of the blades extending longitudinally perpendicular to a direction of said gas flow and being curved in the direction of gas flow through said gas channel;
   at least one displaceable frame mounted on the housing in the gas channel;
   a plurality of flat jet nozzles mounted on the frame and pulsing respective flat jets of wash water over the blades transversely to the direction of gas flow;
   supply means for delivering the wash water to the plurality of the jet nozzles and including:
      a supply pipe, and
      a plurality of flexible hoses connected with the supply pipe and the jet nozzles; and
      actuating means including at least one linear drive for displacing the frame perpendicular to said direction of gas flow and to the longitudinal extent of said blades.

9. The drop separator defined in claim 8, further comprising at least one swinging bar operatively connected with the actuating means and pivotally mounted on a cover of said channel to guide said frame in said channel.

10. The drop separator defined in claim 9 wherein the nozzles are movable angularly to provide an impact angle of the jets within a range from 0° to 15°.

11. The drop separator defined in claim 8 wherein the supply means further includes:
- at least one more supply pipe;
- a plurality of connecting pipes providing communication between the supply pipes; and
- a plurality of connection sockets in flow communication with connecting pipes and the hoses; and
- a plurality of valves provided in the sockets.

12. The drop separator defined in claim 8 wherein said housing has a wall defining said channel and provided with a packing box, said actuating means further including a driving rod extending through the packing box and connected with the linear drive.

13. The drop separator defined in claim 8 wherein each of said plurality of the flat jet nozzles is provided with a respective mouthpiece formed as a flat funnel.

14. The drop separator defined in claim 8 wherein each of said nozzles is mounted on a respective arm.

* * * * *